US012574477B2

(12) United States Patent
Selinger et al.

(10) Patent No.: US 12,574,477 B2
(45) Date of Patent: Mar. 10, 2026

(54) DISTRIBUTED DEEP LEARNING USING A DISTRIBUTED DEEP NEURAL NETWORK

(71) Applicant: Deep Sentinel Corp., Pleasanton, CA (US)

(72) Inventors: David Lee Selinger, Pleasanton, CA (US); Ching-Wa Yip, San Ramon, CA (US); Chaoying Chen, Dublin, CA (US)

(73) Assignee: DEEP SENTINEL CORP., Pleasanton, CA (US)

( * ) Notice: Subject to any disclaimer, the term of this patent is extended or adjusted under 35 U.S.C. 154(b) by 1004 days.

(21) Appl. No.: 15/491,950

(22) Filed: Apr. 19, 2017

(65) Prior Publication Data

US 2018/0307979 A1     Oct. 25, 2018

(51) Int. Cl.
| | |
|---|---|
| *G06N 3/084* | (2023.01) |
| *G06F 9/46* | (2006.01) |
| *G06N 3/045* | (2023.01) |
| *H04N 7/18* | (2006.01) |

(52) U.S. Cl.
CPC .............. H04N 7/183 (2013.01); G06F 9/46 (2013.01); G06N 3/045 (2023.01); G06N 3/084 (2013.01); H04N 7/18 (2013.01)

(58) Field of Classification Search
CPC ............ G06N 3/08; G06N 5/04; G06N 3/084; G06N 3/045; H04N 7/18; H04N 7/183; G06F 9/46
See application file for complete search history.

(56) References Cited

U.S. PATENT DOCUMENTS

| | | | |
|---|---|---|---|
| 2014/0267736 A1* | 9/2014 | DeLean ............... | G06V 40/103 348/152 |
| 2017/0032281 A1* | 2/2017 | Hsu ......................... | G06Q 10/06 |
| 2017/0099200 A1* | 4/2017 | Ellenbogen .......... | G06V 10/764 |
| 2017/0213128 A1* | 7/2017 | Hammond .............. | G06F 9/451 |
| 2018/0278543 A1* | 9/2018 | Gopalan .................. | G06N 3/08 |
| 2018/0285777 A1* | 10/2018 | Li ............................ | G06N 5/04 |

(Continued)

OTHER PUBLICATIONS

Vu, Van-Thinh et al. "Audio-Video Event Recognition System for Public Transport Security." (Jan. 31, 2006). (Year: 2006).*

(Continued)

*Primary Examiner* — Randall K. Baldwin
(74) *Attorney, Agent, or Firm* — Seed Intellectual Property Law Group LLP

(57) ABSTRACT

Apparatus and associated methods relate to training a neural network on a first host system, sending the neural network to a second host system, training the neural network by the second host system based on data private to the second host system, and employing the neural network to filter events sent to the first host system. In an illustrative example, the first host system may be a server having a central repository including trained neural networks and historical data, and the second host system may be a remote server having a data source private to the remote server. The private remote data source may be a camera. In some examples, events may be filtered as a function of a prediction of error in the neural network. Various examples may advantageously provide remote intelligent filtering. For example, remote data may remain private while adaptively filtering events to the central server.

18 Claims, 6 Drawing Sheets

(56)　　　　　　References Cited

U.S. PATENT DOCUMENTS

| 2018/0300631 | A1* | 10/2018 | Roy | G06N 3/088 |
| 2020/0242466 | A1* | 7/2020 | Mohassel | G06N 3/048 |

OTHER PUBLICATIONS

Xu, Dan, et al. "Learning deep representations of appearance and motion for anomalous event detection." arXiv preprint arXiv: 1510.01553 (Oct. 6, 2015): pp. 1-12 (Year: 2015).*

Pouyanfar, Samira, and Shu-Ching Chen. "Automatic video event detection for imbalance data using enhanced ensemble deep learning." International Journal of Semantic Computing 11.01 (Mar. 2017): pp. 85-109. (Year: 2017).*

Wang, Qicong, et al. "Parallelizing Convolutional Neural Networks for Action Event Recognition in Surveillance Videos." International Journal of Parallel Programming 45.4 (2017). (Year: 2017).*

Servia-Rodriguez, Sandra, et al. "Privacy-Preserving Personal Model Training." arXiv preprint arXiv:1703.00380 v1 (Mar. 2017). (Year: 2017).*

* cited by examiner

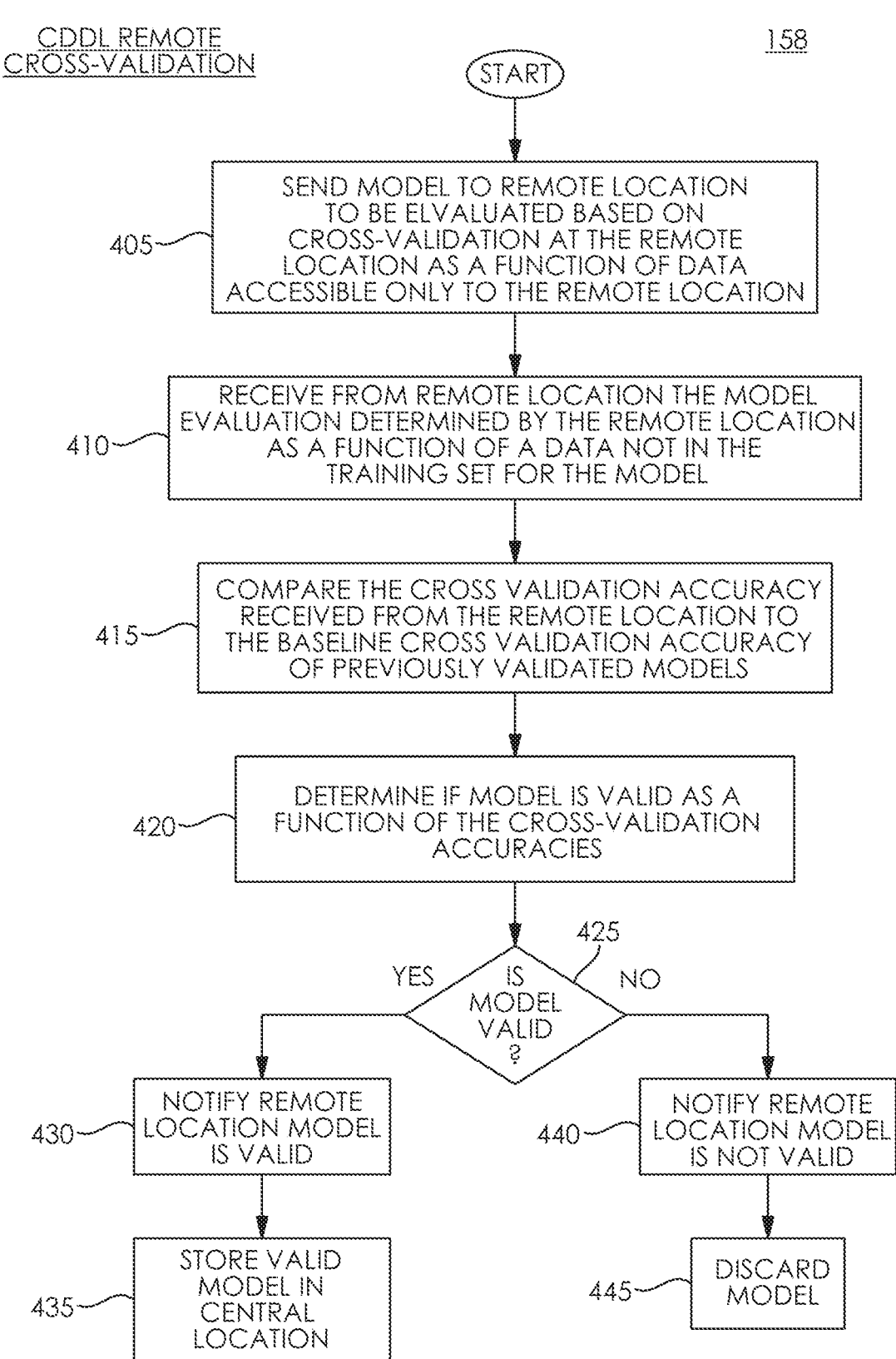

CDDL REMOTE
CROSS-VALIDATION                                                    158

START

405 — SEND MODEL TO REMOTE LOCATION
TO BE ELVALUATED BASED ON
CROSS-VALIDATION AT THE REMOTE
LOCATION AS A FUNCTION OF DATA
ACCESSIBLE ONLY TO THE REMOTE LOCATION

410 — RECEIVE FROM REMOTE LOCATION THE MODEL
EVALUATION DETERMINED BY THE REMOTE LOCATION
AS A FUNCTION OF A DATA NOT IN THE
TRAINING SET FOR THE MODEL

415 — COMPARE THE CROSS VALIDATION ACCURACY
RECEIVED FROM THE REMOTE LOCATION TO
THE BASELINE CROSS VALIDATION ACCURACY
OF PREVIOUSLY VALIDATED MODELS

420 — DETERMINE IF MODEL IS VALID AS A
FUNCTION OF THE CROSS-VALIDATION
ACCURACIES

425
IS
MODEL
VALID
?

YES                    NO

430 — NOTIFY REMOTE
LOCATION MODEL
IS VALID

440 — NOTIFY REMOTE
LOCATION MODEL
IS NOT VALID

435 — STORE VALID
MODEL IN
CENTRAL
LOCATION

445 — DISCARD
MODEL

FIG. 4

DISTRIBUTED DEEP LEARNING USING A DISTRIBUTED DEEP NEURAL NETWORK

TECHNICAL FIELD

Various embodiments relate generally to deep learning based on distributed training and distributed cross-validation of neural networks.

BACKGROUND

Learning machines are machines that learn. Machines that learn may be designed based on machine learning principles. The machine learning field includes the disciplines of computer science, artificial intelligence, and statistics. Many learning machines are employed to make predictions or estimates. The learning algorithms and structures employed by some learning machines may model some of what may be understood of learning algorithms and structures employed by human learners. For example, a human may learn to make predictions or estimates as a function of previously unseen data by analyzing and making predictions based on historical data. Many humans learn by receiving feedback based on their predictions or estimates. For example, someone learning to walk may receive feedback in the form of tripping over objects in their path. Successfully learning to walk may include adapting to avoid objects in the walking path, based on the feedback of tripping over an object. For example, an improvement to walking by a human trainee may include adapting neurons in the trainee's brain in response to feedback. In another illustrative example, someone learning to identify visible objects may receive feedback in the form of an indication of whether their identification was correct. Successfully learning to identify a visible object may include adapting to detect and identify the appearance of the visible object, based on adapting neurons in the trainee's brain in response to the feedback.

Some learning machines may be designed to approximate portions of the physical and chemical structure and operation of human brains. For example, many learning machines are designed to approximate various human brain structures composed of interconnected neurons. Many neurons in human brains are interconnected in biological neural networks having inputs, outputs, and various physical structures and chemical compositions interposed between the inputs and outputs. Biological neural networks may be composed of interconnected living neurons. Some neural networks may have more than one input or more than one output. In some examples of human brain function, a biological neural network may generate an output determined as a function of one or more input. The output of many neural networks may also be determined as a function of characteristics or parameters of the various physical structures and chemical compositions interposed between the inputs and outputs. Some learning machines are based on neural networks implemented in computer hardware and software, or electronic circuits. Neural networks that are not composed of interconnected living neurons may be referred to as artificial neural networks.

Some characteristics or parameters of the structures or compositions interposed between the inputs and outputs of artificial neural networks may be known as weights. Many neural networks are composed of multiple interconnected stages of neurons. Various interconnections and stages of interconnected neurons may have various weights determining the influence on an output response of an input to an interconnection point. In many examples of neural networks, weights may be modeled as generating an output determined as a linear or nonlinear transfer function of an input. Weights may also be referred to as coefficients. Some stages of neural networks may be intermediate, or hidden, between an input and output. The organization of neuron interconnections in stages and the distribution of weights may be referred to as a neural network model. Some neural network models may be defined by the neural network architecture or topology, and the neural network weights. The neural network architecture or topology may define various features of the neural network, including one or more of: the number of neurons in a neural network, the number of weights or coefficients, how the neurons are interconnected, the number of stages, various features of stimulus and response propagation, one or more feedback pathway, or various transfer functions relating one or more output to one or more input. In many neural networks, weights may determine the influence on the output response of various inputs.

Some neural networks may be trained to make predictions or estimates determined to be correct based on predictions previously determined from historical data. In some neural network training, historical data may be provided to a trainee neural network as input data, and the output compared to the desired response. If the response output from the trainee neural network does not match the desired response, the neural network may be stimulated by providing feedback to change the response. In some examples of neural network training, the output determined as a function of a given input may be changed to match the desired output by adapting the weights. An input to a neural network may be referred to as a stimulus. Some neural networks may be trained in multiple passes of providing stimulus to generate a response, comparing the response to the desired response, and if the response does not match the desired response, adapting the weights in the neural network. Many neural networks may be trained using a procedure known as backpropagation.

Some neural networks may be trained in training passes repeated until a desired error rate for the trainee neural network is achieved or until such time as the network appears to have stabilized (called converging). During or after a neural network training procedure, the accuracy of the neural network may be evaluated. The accuracy of some neural networks may be evaluated to determine if training can be stopped due to achieving a desired accuracy. In some examples, a neural network's accuracy may be evaluated to determine if the neural network's accuracy is appropriate for use in making predictions based on previously unseen, live data in a production environment. In some examples, trained neural networks may be evaluated based on a comparison of the trainee neural network's prediction accuracy to the prediction accuracy of previously validated neural networks. The prediction accuracy of a trained neural network may be evaluated by comparison to the prediction accuracy of previously validated neural networks based on a procedure known as cross-validation. Some learning machines may be validated after or during training through testing the learning machine's predictions or estimates based on test data. Some cross-validation procedures may reserve a subset of data for training, and a subset of data for test. Many examples of cross-validation may reserve various portions of the data as the training subset, and other portions of the data as the test subset. Some cross-validation designs attempt to isolate test data from training data. Isolating cross-validation training data from cross-validation test data helps ensure neural networks are validated by comparing the neural network's predictions determined as a function of data not used in training the neural network. In the machine learning field, test data that was not used to train a learning machine may be referred to as Out of Bag data or validation data. In many examples, true Out of Bag data may be data previously unseen by a learning machine. The availability of true Out of Bag Data may enhance the evaluation of learning machines by enabling an estimate of the Out of Bag Error. In many machine learning environments, true Out of Bag data is not available.

SUMMARY

Apparatus and associated methods relate to training a neural network on a first host system, sending the neural network to a second host system, training the neural network by the second host system based on data private to the second host system, and employing the neural network to filter events sent to the first host system. In an illustrative example, the first host system may be a server having a central repository including trained neural networks and historical data, and the second host system may be a remote server having a data source private to the remote server. The private remote data source may be a camera. In some examples, events may be filtered as a function of a prediction of error in the neural network. Various examples may advantageously provide remote intelligent filtering. For example, remote data may remain private while adaptively filtering events to the central server.

Apparatus and associated methods relate to training a neural network on a first host system, sending the neural network to a second host system, training the neural network by the second host system based on data private to the second host system, and employing the neural network to make predictions at the second host system. In an illustrative example, the first host system may be a server having a central repository including trained neural networks and historical data, and the second host system may be a remote server having a data source private to the remote server. The private remote data source may be a camera. In some examples, training the neural network by the second host system may be repeated a number of times. Various examples may advantageously provide remote customization. For example, the neural network may be further customized to recognize data private to the remote server.

Apparatus and associated methods relate to training a neural network on a first host system, sending the neural network to a plurality of second host systems, training the neural network by each second host system on data private to each second host system, and sending the updated neural network coefficients to the first host system to create a composite neural network based on data private to the plurality of second host systems. In an illustrative example, the first host system may be a central server having a repository including trained neural networks and historical data, and each second host system may be a remote server having a private data source. The private data source may be a camera. Various examples may advantageously provide remote training. For example, the neural network may be further trained to recognize data private to the plurality of remote servers, while maintaining remote data privacy.

Apparatus and associated methods relate to training a neural network on a first host system, sending the neural network to a plurality of second host systems, evaluating the neural network by each second host system based on cross-validation as a function of data private to each second host system, and sending the evaluation result to the first host system. In an illustrative example, the first host system may be a central server having a repository including trained neural networks and historical data, and each second host system may be a remote server having a private data source. The private data source may be a camera. Various examples may advantageously provide remote cross-validation. For example, the neural network may be further evaluated based on cross-validation as a function of data private to the plurality of remote servers, while maintaining remote data privacy.

Apparatus and associated methods relate to training a neural network on a first host system, sending the neural network to a plurality of second host systems, training and evaluating the neural network by each second host system based on data private to each second host system, and rotating the neural networks and updated coefficients to each second host system until the neural network has been trained and cross-validated on all second host systems. In an illustrative example, the first host system may be a central server, and each second host system may be a remote server having a private data source. The private data source may be a camera. Various examples may advantageously develop neural networks selected from many neural network architectures and parameters. For example, the neural network may be developed as a function of data private to the plurality of remote servers, while maintaining remote data privacy.

Various embodiments may achieve one or more advantages. For example, some embodiments may reduce the workload of a central server tasked with monitoring event streams from a remote location. This facilitation may be a result of reducing the amount of data transmitted from the remote location to the central server. In some embodiments, events may be filtered from the live event stream at the remote location based on a prediction of error in a neural network received from the central server. Some implementations may reduce the workload of the central monitoring server while maintaining the privacy of the remote live event stream. Reducing the workload of the central monitoring server while maintaining remote data privacy may be a result of adaptively filtering events based on the remote live event stream while privately retaining the live event data at the remote server. For example, the remote server may build a logistical regression model predicting whether a prediction based on the live event stream is correct or not, and based on the results of this logistical regression may adapt the filter determining which events to send to the central server.

In some embodiments, a neural network may be customized to recognize data private to the remote location. This facilitation may be a result of training a generalized neural network at a central location, and custom training the neural network at a remote location based on data accessible only to the remote location. Such remote customization may be a result of training an initial neural network based on the entire training set, and customizing the neural network based on private remote data while maintaining remote data privacy and without sharing remote training data with the central location. Various implementations may develop neural networks having improved accuracy usable at many locations, while maintaining the privacy of the remote training data. This facilitation may be a result of deploying a trained baseline neural network from a central server to a remote server, training the neural network on data private to the remote server, and sending the updated neural network coefficients to the central server for deployment to other remote locations. Such remote training may improve the neural networks used at many remote locations while never sharing the private remote training data.

In some embodiments, trained neural networks may evaluated with improved accuracy. This facilitation may be a result of deploying a trained neural network to a remote server for cross-validation based on data private to the remote server. Such remote cross-validation may improve the estimation of a neural network's accuracy compared with other neural networks, while maintaining the privacy of the cross-validation test data at the remote server. Various implementations may develop improved neural networks based on many and diverse neural network architectures and neural network parameters. This facilitation may be a result of combining remote training with remote cross-validation in parallel on a massively distributed scale. For example, a baseline neural network derived based on many and diverse neural network architectures and neural network parameters may be deployed to many remote servers to be trained and cross-validated based on data private to each remote server, and rotated to each remote server until the neural network has been trained and cross-validated on all remote systems. Such massively parallel distributed deep learning may develop neural networks with improved accuracy for known problems and may also develop new neural network architectures with the capability to solve yet unknown or intractable problems, due to the diversity of neural network architectures and neural network parameters in the baseline models and the diversity of truly Out of Bag data at the remote servers.

The details of various embodiments are set forth in the accompanying drawings and the description below. Other features and advantages will be apparent from the description and drawings, and from the claims.

BRIEF DESCRIPTION OF THE DRAWINGS

FIG. 4 depicts an embodiment process flow of an exemplary Central Distributed Deep Learning Engine (CDDLE) implementing Remote Cross-validation.

Like reference symbols in the various drawings indicate like elements.

DETAILED DESCRIPTION OF ILLUSTRATIVE EMBODIMENTS

To aid understanding, this document is organized as follows. First, an embodiment collaboration network to develop deep learning neural networks is briefly introduced with reference to FIG. 1. Second, with reference to FIGS. 2-5, the discussion turns to exemplary embodiments that illustrate various embodiment process flows implemented at central and remote servers to develop deep learning neural networks. Specifically, various embodiment process flows of an exemplary Remote Distributed Deep Learning Engine (RDDLE), an exemplary Central Distributed Deep Learning Engine (CDDLE), and an exemplary Massively Parallel Distributed Deep Learning Engine (MPDDLE), are presented. Finally, with reference to FIGS. 6A-6D, the workflow of an exemplary Massively Parallel Distributed Deep Learning Engine (MPDDLE) developing a deep learning neural network is discussed.

Figure 1:
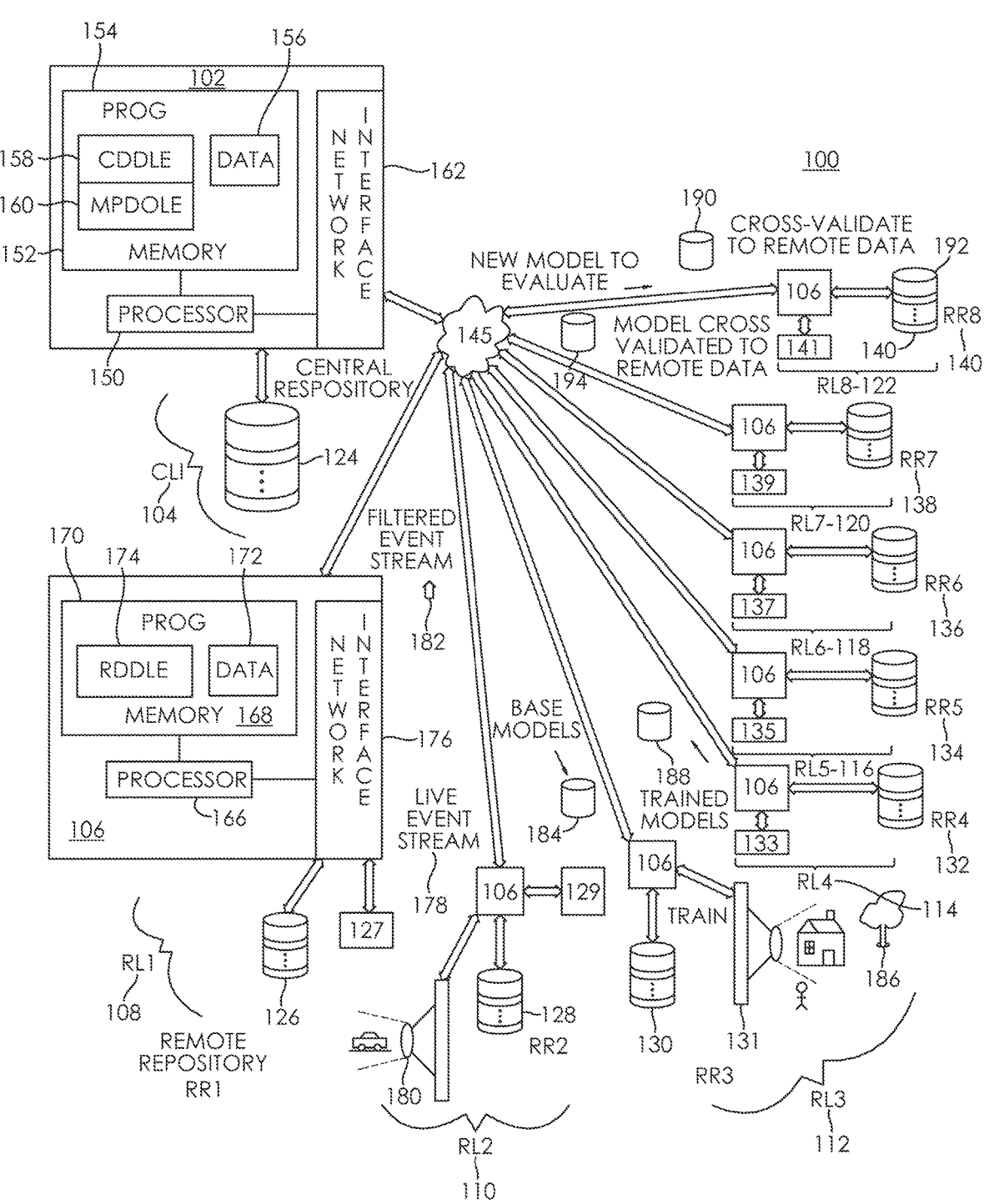
FIG. 1 depicts an exemplary collaboration network training a neural network on a first host system as a function of data accessible only to the first host system, evaluating the trained neural network based on data accessible only to a second host system, and distributing the trained neural network to a learning machine to generate predictive analytic output as a function of input data.

FIG. 1 depicts an exemplary collaboration network 100 training a neural network on a first host system as a function of data accessible only to the first host system, evaluating the trained neural network based on data accessible only to a second host system, and distributing the trained neural network to a learning machine to generate predictive analytic output as a function of input data. In FIG. 1, an exemplary central server 102 at central location CL1 104 is collaborating with an exemplary network of homogeneous remote servers 106 to develop a deep neural network. In some examples, the central server 102 may transmit a trained neural network to be further trained at a remote server 106 to select and send to the central server 102 only events of interest from data accessible only to the remote server 106. In some designs, the central server 102 may send a trained neural network to be customized by a remote server 106 for use in making predictions at a remote server 106 based on data accessible only to the remote server 106. In various implementations, the remote server 106 may send to central server 102 the neural network trained on data accessible only to the remote server 106, while maintaining the privacy of the data at the remote server 106 by not sending the data to the central server 102. In various embodiments, the central server 102 may send a trained neural network to a remote server 106 to be evaluated by the remote server 106 based on data accessible only to the remote server 106. In an illustrative example, the central server 102 may send a neural network to a group of remote servers 106 to be trained and evaluated separately on data accessible only to each of the group of remote servers 106. In various designs, the central server 102 may rotate the neural networks to be trained and evaluated separately at each of the group of remote servers 106. In some examples a neural network trained and evaluated separately at each of the group of remote servers 106 may be deployed for use at a new location, while maintaining the privacy of the data at the group of remote servers 106 by not transmitting the training data from the remote servers.

In an illustrative example, the depicted remote servers 106 are at remote locations RL1 108, RL2 110, RL3 112, RL4 114, RL5 116, RL6 118, RL7 120, and RL8 122. Central location 104 includes central repository 124. In various implementations, the central repository 124 may include, but may not be limited to, one or more of: trained neural networks, neural networks to be evaluated, neural network architecture definitions, neural network training algorithms; neural network evaluation algorithms, filtered event data, unfiltered event data, training data, test data, or validation data. Remote location RL1 108 includes Remote Repository RR1 126 and Remote Location RL1 data source 127. In various designs, the Remote Location RL1 data source 127 may be a source of data initially accessible only by a remote server 106 located at Remote Location RL1. In some designs, data from the Remote Location RL1 data source 127 may never be sent to any other server or location including the central server 102 at central location CL1 104, or any of the other remote servers 106 at remote locations RL2 110, RL3 112, RL4 114, RL5 116, RL6 118, RL7 120, or RL8 122. Remote location RL2 110 includes Remote Repository RR2 128 and Remote Location RL2 data source 129. In the depicted embodiment Remote Location RL2 data source 129 may be a camera. Remote Location RL3 112 includes Remote Repository RR3 130 and Remote Location RL3 data source 131. In the depicted embodiment Remote Location RL3 data source 131 is a camera. Remote Location RL4 114 includes Remote Repository RR4 132 and Remote Location RL4 data source 133. Remote Location RL5 116 includes Remote Repository RR5 134 and Remote Location RL5 data source 135. Remote Location RL6 118 includes Remote Repository RR6 136 and Remote Location RL6 data source 137. Remote Location RL7 120 includes Remote Repository RR7 138 and Remote Location RL7 data source 139. Remote Location RL8 122 includes Remote Repository RR8 140 and Remote Location RL8 data source 141. The remote servers 106 at remote locations RL1 108, RL2 110, RL3 112, RL4 114, RL5 116, RL6 118, RL7 120, and RL8 122 are communicatively coupled with the central server 102 through network cloud 145.

In the depicted embodiment the exemplary central server 102 includes processor 150 that is in electrical communication with memory 152. The depicted memory 152 includes program memory 154 and data memory 156. The memory 154 also includes data and program instructions to implement Central Distributed Deep Learning Engine (CDDLE) 158 and Massively Parallel Distributed Deep Learning Engine (MPDDLE) 160. The processor 150 is operably coupled to network interface 162. The network interface 162 is configured to communicatively couple the processor 150 to the central repository 124 and network cloud 145. In various implementations, the network interface 162 may be configured to communicatively couple the processor 150 to other networks. In some designs, the processor 150 may be operably coupled to more than one network interface. In various embodiments, the central server 102 may be communicatively coupled to more than one network.

In the depicted embodiment each of the exemplary remote servers 106 at remote locations RL1 108, RL2 110, RL3 112, RL4 114, RL5 116, RL6 118, RL7 120, and RL8 include a processor 166 that is in electrical communication with memory 168. The depicted memory 168 includes program memory 170 and data memory 172. The memory 168 also includes data and program instructions to implement Remote Distributed Deep Learning Engine (RDDLE) 174. The processor 166 is operably coupled to network interface 176. The network interface 176 is configured to communicatively couple the processor 166 to a remote repository private to each remote server 106. The network interface 176 is also configured to communicatively couple the processor 166 to a data source private to each remote server 106. In the depicted embodiment, the processor 166 at remote location RL1 108 is communicatively coupled by the network interface 176 to the Remote Repository RR1 126, Remote Location RL1 data source 127, and network cloud 145; the processor 166 at remote location RL2 110 is communicatively coupled by the network interface 176 to the Remote Repository RR2 128, Remote Location RL2 data source 129, and network cloud 145; the processor 166 at remote location RL3 112 is communicatively coupled by the network interface 176 to the Remote Repository RR3 130, Remote Location RL3 data source 131, and network cloud 145; the processor 166 at remote location RL4 114 is communicatively coupled by the network interface 176 to the Remote Repository RR4 132, Remote Location RL4 data source 133, and network cloud 145; the processor 166 at remote location RL5 116 is communicatively coupled by the network interface 176 to the Remote Repository RR5 134, Remote Location RL5 data source 135, and network cloud 145; the processor 166 at remote location RL6 118 is communicatively coupled by the network interface 176 to the Remote Repository RR6 136, Remote Location RL6 data source 137, and network cloud 145; the processor 166 at remote location RL7 120 is communicatively coupled by the network interface 176 to the Remote Repository RR7 138, Remote Location RL7 data source 139, and network cloud 145; and, the processor 166 at remote location RL8 122 is communicatively coupled by the network interface 176 to the Remote Repository RR8 140, Remote Location RL8 data source 141, and network cloud 145.

In some embodiments, the central server 102 may be tasked with monitoring events from a remote server. In the depicted embodiment, the remote server 106 at remote location RL2 110 has received from the central server 106 a generalized neural network trained by the central server 106 as a good solution to a known problem based on data known to the central server. In an illustrative example, the remote server 106 at remote location RL2 110 is processing data stream 178 private to remote location RL2 110. In the depicted embodiment, the data stream 178 is an image stream from a camera capturing images of a scene 180. In the depicted embodiment, scene 180 is a view of a motor vehicle. In some embodiments, the remote server 106 at remote location RL2 110 may further train the neural network received from the central server 102 using data from the data stream 178 private to remote location RL2 110. In various implementations, the remote server 106 at remote location RL2 110 may retain the further trained neural network at remote location RL2 110. In some designs, the remote server 106 at remote location RL2 110 may continue to train and evaluate the trained neural network at remote location RL2 110 based on data from the data stream 178 private to remote location RL2 110. In various embodiments, the neural network further trained on data from the data stream 178 private to remote location RL2 110 may be periodically evaluated to determine the contribution of the neural network training on private data to the reduction in total error in the network. In some designs, the neural network may be employed to select events of interest from the data stream 178 private to remote location RL2 110. In an illustrative example, selected events of interest from the data stream 178 private to remote location RL2 110 may be sent to the central server 102 in filtered event stream 182. In some examples, events of interest may be selected by the neural network based on a logistic regression model estimating whether a prediction concerning an event of interest may be correct. In various embodiments, the remote server 106 at remote location RL2 110 may adaptively adjust the selection of events to transmit to the central server 102 based on the logistic regression. In some designs, the central server 102 may continue to receive new and interesting events while reducing the workload of the central server 102 monitoring events from remote location RL2 110. In some examples, the workload of the central server 102 monitoring events may be reduced by the adaptive adjustment of the selection of events to transmit to the central server 102, based on the logistic regression as a function of the neural network training on private data.

In the depicted embodiment, the remote server 106 at remote location RL3 112 has received a baseline neural network model 184 from the central server 102. In an illustrative example, the remote server 106 at remote location RL3 112 is processing the data stream from data source 131 private to the remote server 106 at remote location RL3 112. In the depicted embodiment, the data source 131 is an image stream from a camera capturing images of a scene 186. In the depicted embodiment, scene 186 is a view of a housing structure having a human person approaching the front door. In the depicted embodiment, the remote server 106 at remote location RL3 112 customizes the baseline neural network 184 for use at location RL3 112 by training the neural network on data source 131 private to the remote server 106 at remote location RL3 112. In various examples, the remote server 106 at remote location RL3 112 may train the baseline neural network 184 based on a forward and backward propagation to obtain a customized neural network 188. In the depicted embodiment, the customized neural network 188 is a modified version of the baseline neural network 184. In various examples, the customized neural network 188 has been additionally trained on the data source 131 private to the remote server 106 at remote location RL3 112. In some designs, the customized neural network 188 may be cross-validated by the remote server 106 at remote location RL3 112 based on data private to the remote server 106 at remote location RL3 112. In various embodiments, the remote server 106 at remote location RL3 112 may repeat the training of the neural network 188 a number of times, further customizing the coefficients of the baseline neural network 184 received from central server 102. In some implementations, the remote server 106 at remote location RL3 112 may repeat the cross-validation of the neural network 188 a number of times. In some implementations, the remote server 106 at remote location RL3 112 may employ the trained or cross-validated neural network 188 to make predictions as a function of the neural network 188 and data private to remote location RL3 112. In some embodiments, the remote server 106 at remote location RL3 112 may benefit from all the data in the rest of the training set, and may tune the machine learning neural network to be customized to its specific situation, and may do so without sharing private data with other locations. In various designs, the customized neural network 188 may be retained by the remote server 106 at remote location RL3 112, without ever sending the customized neural network 188 to the central server 102. In the depicted embodiment, the trained neural network 188 is transmitted to the central server 102, to be deployed to servers other than remote server 106 at remote location RL3 112, for use in making predictions or for further training or cross-validation. In the depicted embodiment, the training and cross-validation data private to each remote server location never leave the remote location.

In the depicted embodiment, the remote server 106 at remote location RL8 122 has received neural network 190 from the central server 102 to be evaluated based on data private to the remote server 106 at remote location RL8. In some examples, the remote server 106 at remote location RL8 122 may evaluate the neural network 190 based on data source 141 private to remote server 106 at remote location RL8 122. In various implementations, the remote server 106 at remote location RL8 122 may evaluate the neural network 190 based on data 192 private to remote location RL8 122 from Remote Repository RR8 140. In some designs, the remote server 106 at remote location RL8 122 may evaluate the neural network 190 based on cross-validation as a function of data and validated neural networks private to remote location RL8 122 from Remote Repository RR8 140. In some examples, the neural network 190 may be cross-validated as a function of true Out of Bag data private to remote location RL8 122, which the neural network 190 may not have previously processed. In some embodiments, the remote server 106 at remote location RL8 122 may evaluate the neural network 190 based on cross-validation as a function of validated neural networks or data received from the central server 102. In the depicted embodiment, the remote server 106 at remote location RL8 122 transmits the cross-validated neural network 194 to the central server 102. In various implementations, the transmission of the cross-validated neural network 194 to the central server 102 may include the transmission of the results of the cross-validation of the neural network 194 by the remote server 106 at remote location RL8 122.

In some examples, the central server 102 may coordinate the collaborative development of a deep neural network based on many distributed remote servers 106. In an illustrative example, the central server 102 may send a copy of an initial neural network to the depicted remote servers 106 at remote locations RL1 108, RL2 110, RL3 112, RL4 114, RL5 116, RL6 118, RL7 120, and RL8 122. In some designs, the initial neural network may be generated by the central server 102 from numerous neural network architectures and topologies. In various implementations, the neural network architectures and topologies defining the initial neural network may be randomly generated and a copy sent to the remote servers 106. In various designs, each of the remote servers 106 at remote locations RL1 108, RL2 110, RL3 112, RL4 114, RL5 116, RL6 118, RL7 120, and RL8 122 may train the initial neural network to obtain a derivative neural network based on data private to each remote server 106. In some embodiments, each of the remote servers 106 at remote locations RL1 108, RL2 110, RL3 112, RL4 114, RL5 116, RL6 118, RL7 120, and RL8 122 may cross-validate the derivative neural network trained by the remote server 106 without sending the neural network to another server. In some examples, a derivative neural network satisfying the initial cross-validation criteria may be identified as a candidate neural network to be further trained and cross-validated by other remote servers 106. In various implementations, the central server 102 may coordinate the rotation of the trained and cross-validated derivative neural networks among the remote servers 106 at remote locations RL1 108, RL2 110, RL3 112, RL4 114, RL5 116, RL6 118, RL7 120, and RL8 122, for additional training and cross-validation based on data private to each remote server 106. In various designs, the central server 102 may continue the rotation of the trained and cross-validated derivative neural networks among the remote servers 106 until each remote server 106 at remote locations RL1 108, RL2 110, RL3 112, RL4 114, RL5 116, RL6 118, RL7 120, and RL8 122 has trained and cross-validated each neural network trained by each remote server. In some examples, numerous different neural network architectures can be trained and evaluated in parallel by the remote servers 106 computing the result of a new neural network architecture, without exposing the data private to each remote server.

In some embodiments, the central server 102 can be configured to perform the actions of architecture optimization, such as pruning nodes, architecture combinations (e.g., where various networks can be combined by stacking or running in parallel) or by creating ensemble architectures (e.g., running networks in parallel and combining the results using an ensemble method). One of ordinary skill in the art would appreciate that there are numerous architecture optimization actions that could be implemented on the central server, and the system and methods provided herein are contemplated for use with any such architecture optimizations.

Figure 2:
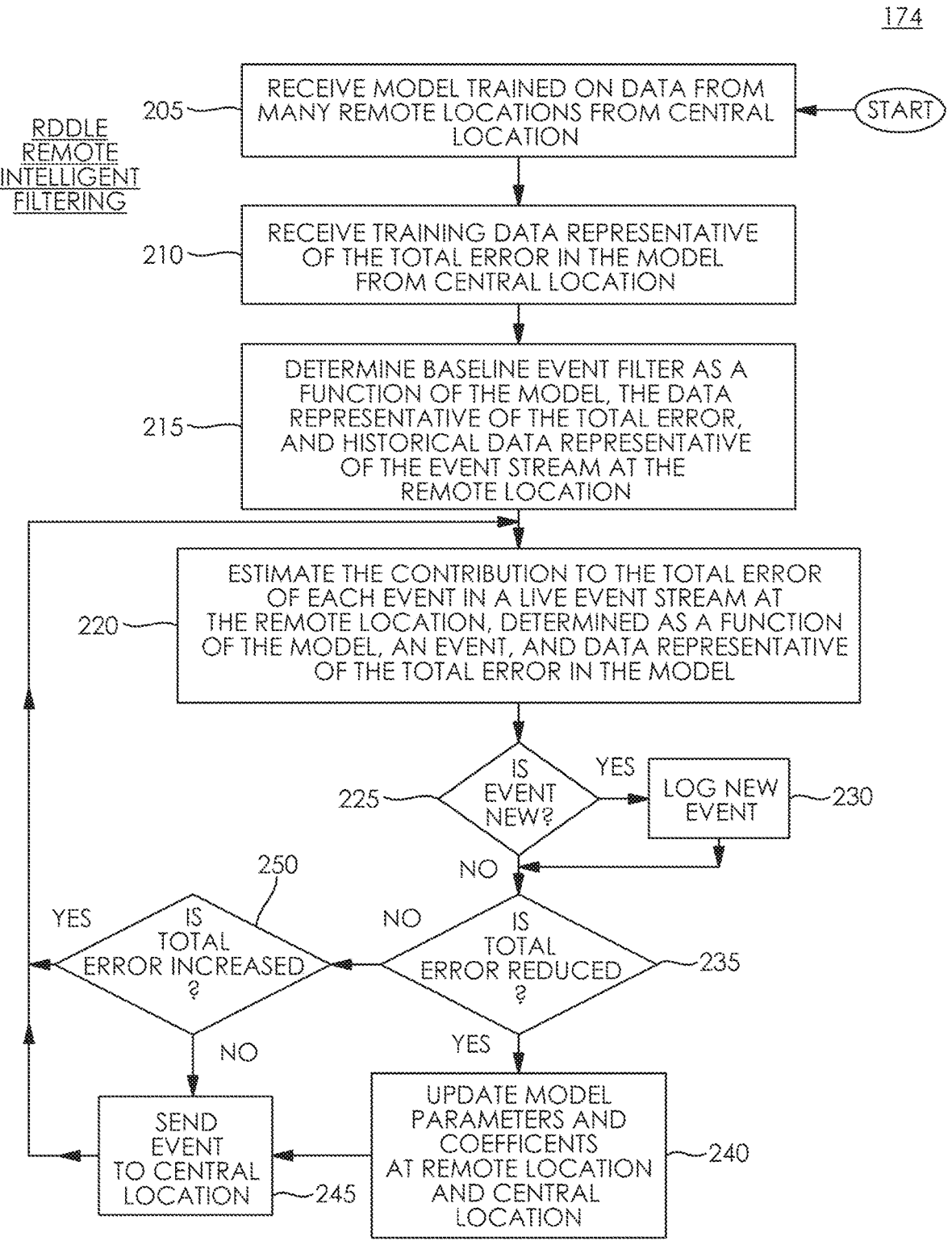
FIG. 2 depicts an embodiment process flow of an exemplary Remote Distributed Deep Learning Engine (RDDLE) implementing Remote Intelligent Filtering.

FIG. 2 depicts an embodiment process flow of an exemplary Remote Distributed Deep Learning Engine (RDDLE) implementing Remote Intelligent Filtering. The method depicted in FIG. 2 is given from the perspective of the Remote Distributed Deep Learning Engine (RDDLE) 174 executing as program instructions on processor 166 of any of remote servers 106 at locations RL1 108, RL2 110, RL3 112, RL4 114, RL5 116, RL6 118, RL7 120, or RL8 122, depicted in FIG. 1. The depicted method begins with the processor 166 receiving 205 from a central location a model trained on data from remote locations. The method continues with the processor 166 receiving 210 from a central location training data representative of the total error in the received model. The method continues with the processor 166 determining 215 a baseline event filter as a function of the received model, the data representative of the total error, and historical data representative of the event stream at the remote location. The method continues with the processor 166 estimating 220 the contribution to the total error of each event in the live event stream at the remote location, determined as a function of the received model, an event from the live event stream, and data representative of the total error in the model. The method continues with the processor 166 determining 225 if the event is new. Upon a determination 230 the event is new, the processor 166 logs the new event. Upon a determination 230 the event is not new, the processor 166 determines 235 if the total error is reduced. Upon a determination the total error is not reduced, the processor 166 determines 250 if the total error is increased. Upon a determination the total error is increased, the method continues at step 220 with the processor 166 estimating 220 the contribution to the total error of each event in the live event stream at the remote location, determined as a function of the received model, an event from the live event stream, and data representative of the total error in the model. Upon a determination the total error is not increased, the processor 166 sends 245 the event to the central location, and the method continues at step 220 with the processor 166 estimating 220 the contribution to the total error of each event in the live event stream at the remote location, determined as a function of the received model, an event from the live event stream, and data representative of the total error in the model. Returning for illustrative purpose of discussion to step 235, upon a determination the total error is reduced, the processor 166 updates 240 the model parameters and coefficients at the remote location and central location, the processor 166 sends 245 the event to a central location, and the method continues at step 220 with the processor 166 estimating 220 the contribution to the total error of each event in the live event stream at the remote location, determined as a function of the received model, an event from the live event stream, and data representative of the total error in the model.

Figure 3:
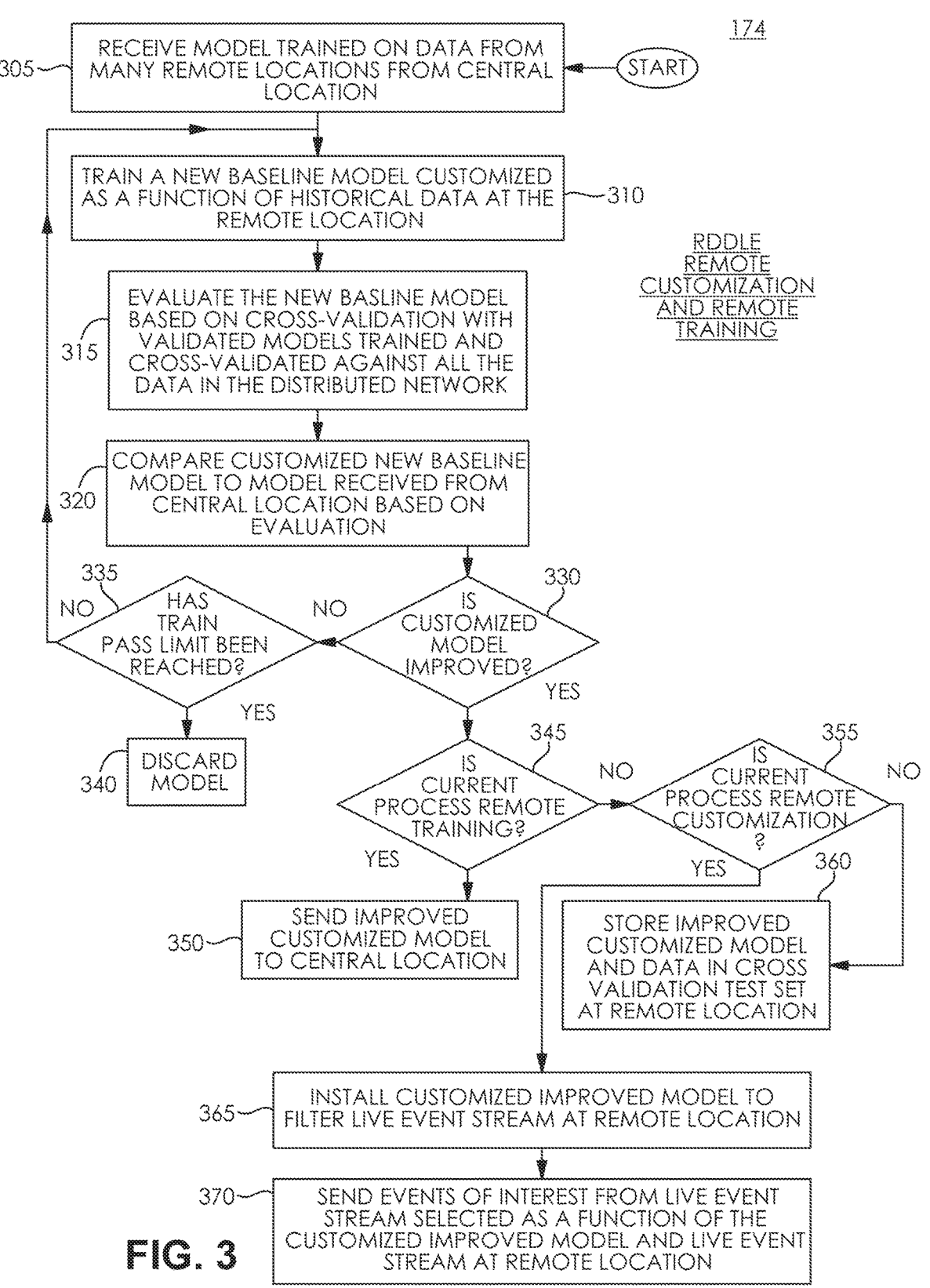
FIG. 3 depicts an embodiment process flow of an exemplary Remote Distributed Deep Learning Engine (RDDLE) implementing Remote Customization and Remote Training.

FIG. 3 depicts an embodiment process flow of an exemplary Remote Distributed Deep Learning Engine (RDDLE) implementing Remote Customization and Remote Training. The method depicted in FIG. 3 is given from the perspective of the Remote Distributed Deep Learning Engine (RDDLE) 174 executing as program instructions on processor 166 of any of remote servers 106 at locations RL1 108, RL2 110, RL3 112, RL4 114, RL5 116, RL6 118, RL7 120, or RL8 122, depicted in FIG. 1. The depicted method begins with the processor 166 receiving 305 from a central location a model trained on data from many remote locations. The method continues with the processor 166 training 310 a new baseline model customized as a function of historical data at the remote location. The method continues with the processor 166 evaluating 315 the new baseline model based on cross-validation with validated models trained and cross-validated against all the data in the distributed model. The method continues with the process 166 comparing 320 the customized baseline model to the model received from the central location, wherein the comparison is based on the evaluation of the baseline model. The method continues with the processor determining 330 if the customized baseline model has been improved. Upon a determination the baseline model has not been improved, the method continues with the processor determining 335 if the training pass limit has been reached. Upon a determination the training pass limit has been reached, the processor 340 discards the model. Upon a determination the training pass limit has not been reached, the method continues at step 310 with the processor 166 training a new baseline model customized as a function of historical data at the remote location. Returning for illustrative purpose of discussion to step 330, upon a determination the customized baseline model has been improved, the processor 166 determines 345 if the current process is remote training. Upon a determination the current process is remote training, the processor sends 350 the improved customized model to the central location. Upon a determination the current process is not remote training, the processor 166 determines 355 if the current process is remote customization. Upon a determination the current process is not remote customization, the processor 166 stores 360 the improved customized model and data in the cross-validation test set at the remote location. Upon a determination the current process is remote customization, the processor 166 installs 365 the customized improved model to filter a live event stream at the remote location, and the processor 166 sends events of interest from the live event stream selected as a function of the customized improved model and the live event stream at the remote location 370.

FIG. 4 depicts an embodiment process flow of an exemplary Central Distributed Deep Learning Engine (CDDLE) implementing Remote Cross-validation. The method depicted in FIG. 4 is given from the perspective of the Central Distributed Deep Learning Engine (CDDLE) 158 executing as program instructions on processor 150, depicted in FIG. 1. The depicted method begins with the processor 150 sending 405 a model to a remote location to be evaluated based on cross-validation at the remote location as a function of data accessible only to the remote location. The method continues with the processor 150 receiving 410 from the remote location the model evaluation determined at the remote location by cross-validation as a function of data not in the training set for the model. The method continues with the processor 150 comparing 415 the cross-validation accuracy received from the remote location to the baseline cross-validation accuracy of previously validated models. The method continues with the processor 150 determining 420 if the model is valid as a function of the cross-validation accuracies. Upon a determination 425 by the processor 150 the model is valid, the processor 150 notifies 430 the remote location the model is valid, and the processor 150 stores 435 the valid model in the central repository. Upon a determination 425 by the processor 150 the model is not valid, the processor 150 notifies 440 the remote location the model is not valid, and the processor 150 discards 445 the model.

Figure 5:
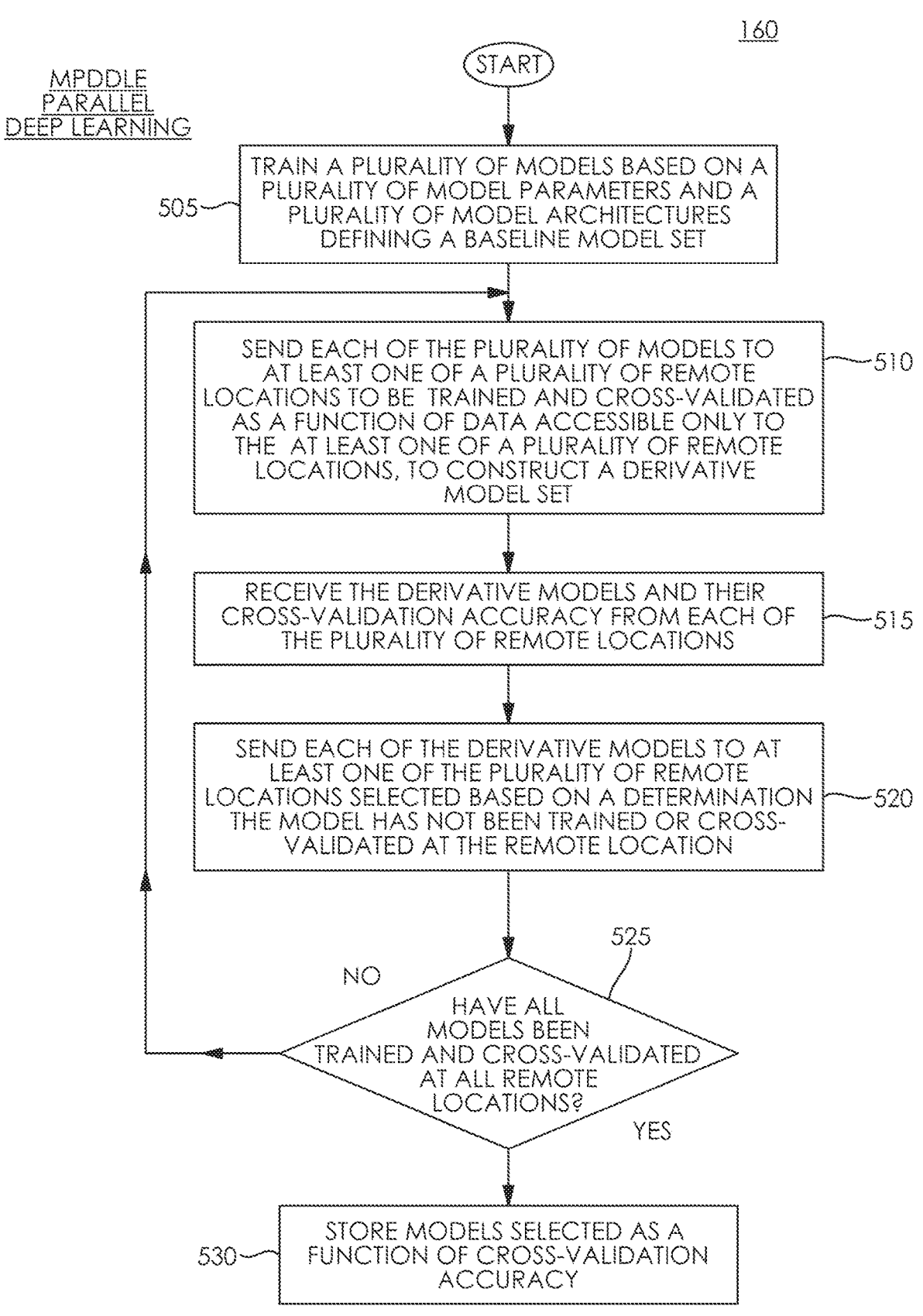
FIG. 5 depicts an embodiment process flow of an exemplary Massively Parallel Distributed Deep Learning Engine (MPDDLE) implementing Parallel Deep Learning.

FIG. 5 depicts an embodiment process flow of an exemplary Massively Parallel Distributed Deep Learning Engine (MPDDLE) implementing Parallel Deep Learning. The method depicted in FIG. 5 is given from the perspective of the Massively Parallel Distributed Deep Learning Engine (MPDDLE) 160 executing as program instructions on processor 150, depicted in FIG. 1. The depicted method begins with the processor 150 training 505 a plurality of model parameters and a plurality of model architectures defining a baseline model set. The method continues with the processor 150 sending 510 each of the plurality of models to at least one of a plurality of remote locations to be trained and cross-validated as a function of data accessible only to the at least one of a plurality of remote locations, to construct a derivative model set. The method continues with the processor 150 receiving 515 the derivative models and their cross-validation accuracy from each of the plurality of remote locations. The method continues with the processor 150 sending 520 each of the derivative models to at least one of the plurality of remote locations selected based on a determination the model has not been trained or cross-validated at the remote location. The method continues with the processor 150 determining 525 if all models have been trained and cross-validated at all remote locations. Upon a determination all models have not been trained and cross-validated at all remote locations, the method continues at step 510 with the processor 150 sending each of the plurality of models to at least one of a plurality of remote locations to be trained and cross-validated as a function of data accessible only to the at least one of a plurality of remote locations, to construct a derivative model set. Upon a determination all models have been trained and cross-validated at all remote locations, the processor 150 stores 530 in a central repository models selected as a function of cross validation accuracy.

Figures 6A, 6B, 6C, 6D:
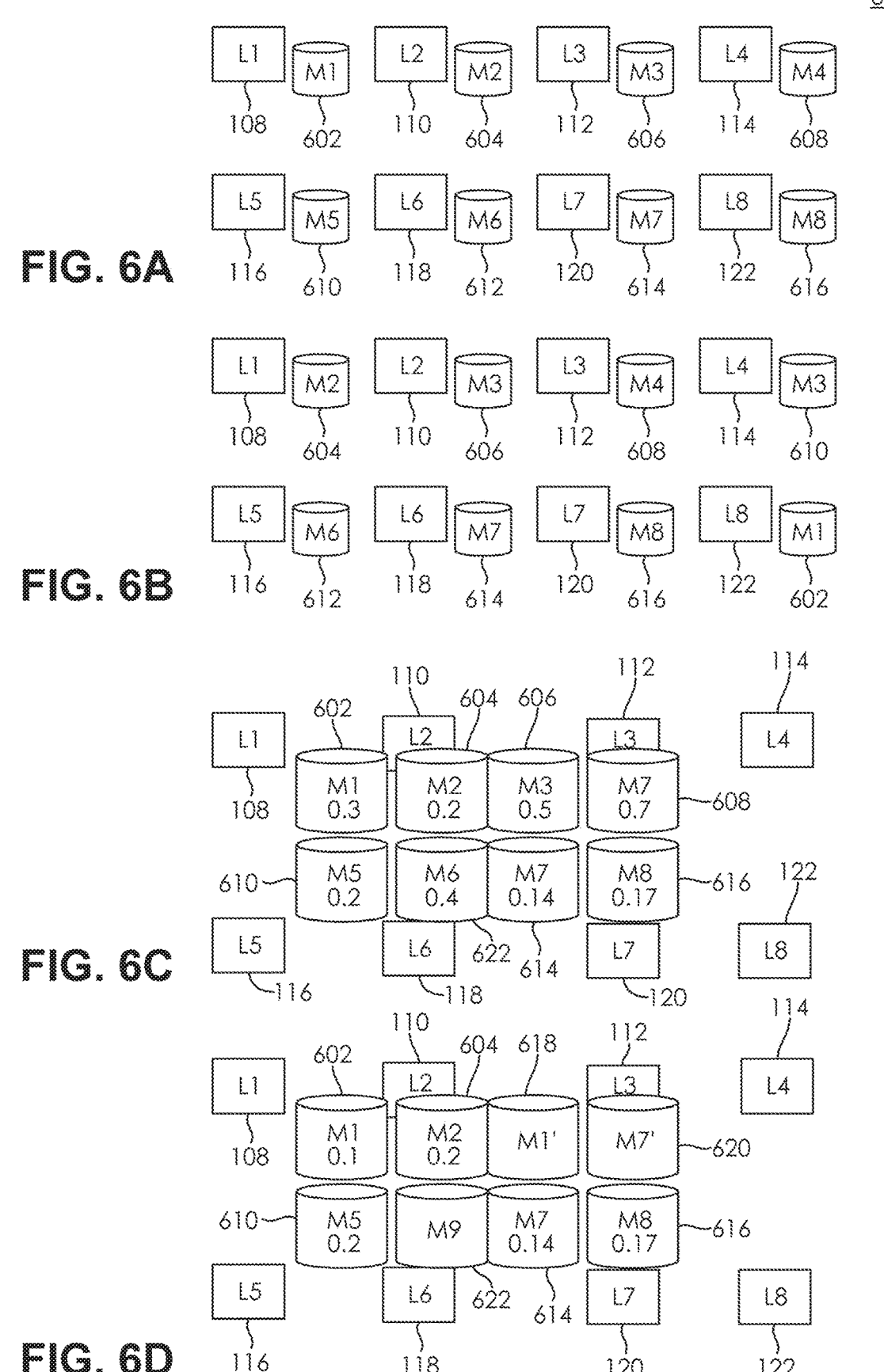
FIGS. 6A-6D depict a workflow view of an exemplary Massively Parallel Distributed Deep Learning Engine (MPDDLE) developing a deep learning neural network.

FIGS. 6A-6D depict a workflow view of an exemplary Massively Parallel Distributed Deep Learning Engine (MPDDLE) developing a deep learning neural network. In FIG. 6A, neural network M1 602 is sent to a server at location L1 108, neural network M2 604 is sent to a server at location L2 110, neural network M3 606 is sent to a server at location L3 112, neural network M4 608 is sent to a server at location L4 114, neural network M5 610 is sent to a server at location L5 116, neural network M6 612 is sent to a server at location L6 118, neural network M7 614 is sent to a server at location L7 120, and neural network M8 616 is sent to a server at location L8 122. In an illustrative example, each server at each location L1, L2, L3, L4, L5, L6, L7, and L8 may have data private to each location. In some embodiments, the neural network is trained and cross-validated at each location based on data private to each location. In the depicted embodiment, the models may be rotated among the locations so that a server at each location trains and then cross-validates each neural network based on data private to each location. For example, in a network having eight nodes, eight rotations would be needed to achieve training and cross-validation of all neural networks one time by all eight nodes.

In FIG. 6B, the neural networks M1, M2, M3, M4, M5, M6, M7, and M8 have been rotated among locations L1, L2, L3, L4, L5, L6, L7, and L8. In the depicted embodiment, neural network M1 602 has been rotated to a server at location L8 122, neural network M2 604 has been rotated to a server at location L1 108, neural network M3 606 has been rotated to a server at location L2 110, neural network M4 608 has been rotated to a server at location L3 112, neural network M5 610 has been rotated to a server at location L4 114, neural network M6 612 has been rotated to a server at location L5 116, neural network M7 614 has been rotated to a server at location L6 118, neural network M8 616 has been rotated to a server at location L7 120, and neural network M1 602 has been rotated to a server at location L8 122.

In FIG. 6C, the neural networks M1, M2, M3, M4, M5, M6, M7, and M8 have been rotated among all locations L1, L2, L3, L4, L5, L6, L7, and L8 for training and cross validation of each neural network by all locations on data private to each location. In the depicted embodiment, scores have been determined for each neural network based on the distributed cross-validation pass through the computational grid. In an illustrative example, each neural network score may be a numeric expression of the prediction error determined as a function of the distributed cross-validation of each neural network by all locations on data private to each location. For example, in the depicted embodiment, neural network M1 has a measured error of 0.1, neural network M2 has a measured error of 0.2, neural network M3 has a measured error of 0.5, neural network M4 has a measured error of 0.7, neural network M5 has a measured error of 0.5, neural network M6 has a measured error of 0.4, neural network M7 has a measured error of 0.14, and neural network M8 has a measured error of 0.17. In some examples, the most accurate neural networks may be retained for regression tests or cross validation. In some embodiments, some neural networks may be subjected to further iterative parallel training and cross validation. In some designs, cross-validated neural networks may be further trained to create derivative neural networks. In various examples, runner-up neural networks may be retained and cross-validated with new emerging data to determine if the runner-up neural networks may be better suited to the new emerging data.

In FIG. 6D, after distributed training and cross-validation through the computational grid at locations L1, L2, L3, L4, L5, L6, L7, and L8, new neural networks have been created based on distributed parallel evaluation of diverse neural network architectures as a function of true out of bag data private to each location. For example, at location L3, new neural network M1' 618 has been created at location L3 as a derivative of initial neural network M1 602, new neural network neural network M7' 620 has been created at location L4 as a derivative of initial model M7 616, and new neural network M9 622 has been created at location L6.

Although various embodiments have been described with reference to the Figures, other embodiments are possible. For example, in an illustrative example, Deep Learning uses neural network architectures designed to perform specific types of machine learning, such as image recognition or speech recognition. In some embodiments, Deep Learning includes two main steps: training and validating. Both of these steps require vast amounts of data, memory and computational power.

In various implementations, the disclosed apparatus and associated methods may distribute a deep neural network across hundreds and thousands of machines in a way that minimizes the communication overhead, enabling these machines to also be distributed over a broad geographic region. In some designs, the disclosed apparatus and associated methods may enable a deep neural network to adapt to and learn about information which is also distributed across a large geographic region without requiring that all this information be centralized-a task that by itself could overwhelm the network infrastructure especially in remote regions.

In some embodiments, a deep neural network built for camera security may analyze each frame and chunk of frames (video) to determine what is in these frames—is it simply a tree waving in the wind, or is there a potential security threat approaching a building?

Video information is a huge amount of data—especially when considered in the context of security, where an average home can generate terabytes of information in the matter of a few days. Far too much for even modern network (or even next-generation network!) to centralize in an ongoing basis. Therefore using current machine learning techniques, the information must be reduced before being transferred (losing significant amounts of signal).

In various implementations, the disclosed apparatus and associated methods may solve this by distributing parts of the computation to the location where the data are generated. For example, by putting a special machine-learning machine in a home in Oklahoma City, OK, the cloud services housed in San Jose, CA would send a very small amount of code (code which describes the current best neural network) to Oklahoma City instead of requesting all of the video be sent from the home in Oklahoma City back to San Jose. This could mean transmitting 10 MB of data from San Jose to Oklahoma City instead of transmitting 2 TB of data from Oklahoma City to San Jose.

The disclosed apparatus and associated methods include various designs. In some embodiments of the Remote intelligent filtering approach, the model training and cross-validation still occur at a central location. In various examples, at the remote location, where there is a huge amount of data, specific events are transmitted to a central repository, and these events are selected based on a prediction of their contribution to the reduction in total error in the neural network. For example, if a camera at the home in Oklahoma City is pointed up a chimney, and it is the only camera in the entire network so positioned it is possible that all of its predictions are incorrect. In some designs, the remote location would build a logistical regression model predicting whether a prediction is correct or not, and based on the results of this logistical regression would decide to send many video events related to the chimney back the central repository.

In some examples of the Remote Customization approach, a model once built can be customized to be more accurate for a specific location. In some embodiments, once a model has been built, its architecture and coefficients can be encoded, for example in HDF5, and transmitted to a remote location. In various implementations, the coefficients of this initial model (NN) represent the best possible neural network for processing a particular machine learning problem as generalized across all of the potential remote locations. In some designs, at the remote location, a forward and backward propagation of training can be applied to this original model (NN) (as well as cross-validated) to establish a "general baseline" of the model. In an illustrative example, this will result in a slightly modified version of NN, call it NN' which has been trained slightly more on the data specifically located at the remote location. In some embodiments, this process can be repeated a number of times, further customizing the coefficients of the original neural network NN to recognize data only visible from remote location. In some examples, the remote location can benefit from all the data in the rest of the training set, can tune the machine learning neural network to be customized to its specific situation and can do so without ever sharing information with any central location.

In some embodiments of the Remote Training approach, no events from this particular remote location are ever shared with the central repository. In the illustrative Oklahoma City example, the central repository trains a neural network in a single forward and backwards propagation pass through all of the data contained at the central repository. Then, in some embodiments, an initial neural network (NN) may be encoded in a format (such as "HDF5") and distributed sequentially to the remote locations, for example Oklahoma City. In some designs, once the network arrives in Oklahoma city, the remote machine decodes the neural network and its coefficients, then passes through all of its local data through a forwards and backwards propagation pass. In various implementations, this can take as much as an hour or more as this is a lot of data. In some designs, this process of a forward and backward propagation pass will update the coefficients of the neural network, resulting in a new neural network (NN'). In various implementations, these new coefficients will be stored and transmitted back to the central repository. In various embodiments, the original data themselves never leave the remote location-only the updated coefficients as it relates to the neural network are ever transmitted. In some designs, this process is typically repeated 10 or more times (called epochs) to increase the accuracy of the resulting neural network-resulting in NN", NN''', NN'''' etc. In various implementations, through each of these iterations, none of the primary data ever leaves the remote location.

In some embodiments of the Remote Cross-validation approach, like remote training, the primary data source is and stays at the remote location. In various designs, no actual data are ever transmitted out of the location, and none of it is held at the central repository. In an illustrative example, as noted above, building a successful neural network includes at least two critical steps: training and cross-validation. Cross-validation has proven to be as important as training in many examples though this area of the "state-of-the-art" has had very little improvement in dozens of years. In some examples, disclosed methods and apparatus enable a new, secure and highly-performant way of performing cross-validation. In various embodiments, after a model is trained, either all at a single location, or using remote training, or some combination of the two, the model may be validated using remote cross-validation. In various designs, disclosed methods and apparatus include encoding the coefficients of the resulting neural network (NN) into a format such as HDF5. In some embodiments, this neural network is then transmitted to a remote location, for example a home in Oklahoma City. In various implementations, at this home, the specialized neural network machine receives the neural network, decodes it and then performs cross-validation on the network, scoring its accuracy on information the neural network has never seen before.

In some embodiments, the unique architecture of remote training, remote cross-validation and/or remote customization enable the most secure training of an artificial intelligence, without ever having to actually share any information-some of which might be incredibly proprietary. In various designs, the resulting artificial intelligence model (or deep neural network) will have weights (also called coefficients) which take into consideration all of the videos trained, but the central neural network may not have ever seen some sensitive videos which are kept on the remote training or cross-validation machines-never to be shared with any central or 3rd party.

In various implementations, for facilities like highly sensitive facilities or high-security areas, this type of "one-way" data transfer could be incredibly helpful in that they never have to release their actual video footage, but they could benefit from the training of all the other nodes, and still ensure that their specific scenarios or video footage is incorporated in the generation of the final resultant model.

In various embodiments, when combining remote cross-validation with remote-training, numerous different neural network architectures can be compared in parallel. In some designs, this means that while any one remote system is performing only one task at a time training or cross-validating a specific neural network architecture, as a whole, hundreds or thousands of different neural network architectures can be processed simultaneously. In various implementations, this key insight turns this system from an interesting distributed systems architecture into a unique, massively parallel supercomputer. In some embodiments, the result of a pre-determined model may be computed across a number of different machines—the nature of this architecture is that it is not simply computing pre-determined models, but testing and learning new machine learning models/architectures across tens or thousands of distributed nodes all at once—and it is designed to not require the transmission of terabytes of data. In some embodiments, the disclosed apparatus and associated methods may achieve substantially improved results training and analyzing massive numbers of various types of architectures (CNN's, SPP's, RNN's) as well as different configurations of these architectures (for example, the number of layers in a CNN, the number of nodes in an RNN) because the disclosed massively parallel super-computer approach will test/build lots of these and do it in parallel across a massively distributed computational grid, to overcome the significant variation in different types of model architectures and different configurations of the model architectures which may be detrimental to model training in prior art apparatus or methods.

To illustrate the workflow of this distributed supercomputer, let us consider: a set of different locations L1, L2, L3, L4, L5, L6, L7, L8; and, a set of different computational models M1, M2, M3, M4, M5, M6, M7, M8. At Step 1: Each location has a single model and is training it. At step 1b (and repeat), the models can rotate these models so that each location has trained each model and then cross-validated each model. This would have to happen 8 times for each epoch of training, so for example if we trained for "100 epochs" (a typical number of epochs for machine learning training) this step would repeat 800 times across this distributed computational grid. At the end of Step 1, we have model scores—where the score is called the "Error". (in this example, lower numbers are better), and can now iterate the models for another epoch of training. We could, for example take the top few model architectures, keep them the same (to ensure we do not regress), and modify them slightly to create derivatives (e.g., M1' and M7') as well as generate new models. We might also keep the runner-up models in the chance that with new emerging data they are better suited to capturing certain situations. For Step 3, we now have a completely new set of models which can be trained across each of the machines. We now return to step 1 with our new set of models and repeat.

In some embodiments, no data is transferred to a Central location; models are sent to a central location, but not the data. In various designs, a Central location receives model data (trained model). In various designs, a Trained model may be a generalization of all the data is has been trained on. In various implementations, a Central location may coordinate transfer of trained model to other RLs. In an illustrative example, Central location sends model to Remote location: Model=1) Architecture and 2) parameters; Training only changes parameters; Remote location trains model and makes it better; Remote location sends trained model to Central location; Central location then can send updated trained model to Remote location L2, Remote location L3, . . . , Remote location LN, and so on, to many Remote locations LN. In various designs, independent data is never shared outside the various Remote locations. In some embodiments, disclosed apparatus and associated methods may include a system to manage 1000's of different Remote Locations and 1000's of different Central locations to handle this.

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated, within the scope of the following claims.

What is claimed is:

1. A method to train a neural network, comprising:

receiving, by a first host system, training event data filtered from an event data stream having data from a plurality of remote systems;

training, by the first host system, the neural network, based on the filtered training event data;

evaluating, by the first host system, the neural network, based on cross-validation as a function of data accessible only to the first host system;

transmitting, from the first host system to a second host system, the trained neural network;

generating, at the second host system, a customized neural network by further training the trained neural network based on private data only accessible to the second host system;

evaluating, at the second host system, the customized neural network;

installing the customized neural network at the second host system;

applying, at the second host system, the customized neural network to live event stream data accessible to the second host system; and sending, from the second host system to the first host system, updated neural network coefficients based on the customized neural network; and updating, by the first host system, the neural network based on the updated neural network coefficients received from the second host system.

2. The method of claim 1 in which the method further comprises the second host system being remote from the first host system.

3. The method of claim 1 in which the method further comprises the training event data being filtered from the event data stream as a function of a prediction of a contribution of each event in the event data stream to the reduction of error in the neural network.

4. The method of claim 1 in which the method further comprises the event data stream being based on data from a camera.

5. The method of claim 3 in which the method further comprises the prediction of the contribution of each event in the event data stream being based on a determination of whether the prediction is correct or incorrect.

6. The method of claim 3 in which the method further comprises the error in the neural network being determined based on a logistic regression.

7. A method to train a neural network, comprising:

sending, from a first host system, a first neural network to a second host system, wherein the first neural network is trained using data received from a plurality of systems;

training, by the second host system, a second neural network as a function of the first neural network and an event data stream only accessible to the second host system;

evaluating, at the second host system, the second neural network against a former baseline neural network utilized by the second host system;

in response to validating that the second neural network produces results that have an accuracy that is greater than an accuracy of the baseline neural network based on the evaluation of the second neural network against the baseline neural network, installing the second neural network on the second host system;

sending, from the second host system to the first host system, updated neural network coefficients based on the customized neural network; and updating, by the first host system, the neural network based on the updated neural network coefficients received from the second host system.

8. The method of claim 7 in which the method further comprises the first host system being centralized to send the first neural network to a plurality of homogeneous second host systems.

9. The method of claim 7 in which the first neural network is the baseline neural network trained and cross-validated based on data received from a plurality of homogeneous second host systems.

10. The method of claim 7 in which the method further comprises the event data stream being based on data from a camera.

11. The method of claim 7 in which the method further comprises training, by the second host system, the second neural network, being based on a technique selected from the group consisting of forward propagation and backward propagation.

12. The method of claim 7 in which the method further comprises training, by the second host system, a third neural network as a function of the second neural network.

13. The method of claim 7 in which the method further comprises evaluating, by the second host system, the second neural network, based on cross-validation as a function of data accessible only to the second host system.

14. The method of claim 7 in which the method further comprises the second host system generating a prediction determined as a function of the second neural network and input data.

15. A computerized system for training a neural network, comprising:

a first host system, comprising a first processor and a first training event module stored in a first non-transitory memory, wherein the first training event module when executed by the first processor causes the first processor to:

receive training event data filtered from an event data stream having data from a plurality of remote systems;

train the neural network, based on the filtered training event data;

evaluate the neural network, based on cross-validation as a function of data accessible only to the first host system;

transmit, from the first host system to a second host system, the trained neural network; and update the trained neural network based on updated neural network coefficients received from the second host system; and a second host system, comprising a second processor and a second training event module stored in a second non-transitory memory, wherein the second training event module when executed by the second processor causes the second processor to:

generate a customized neural network by further training the neural network received from the first host system as a function of historical data only accessible to the second host system;

evaluate the customized neural network;

install the customized neural network at the second host system;

employ the customized neural network for application to live event stream data; and send the updated neural network coefficients to the first host system based on the customized neural network.

16. The computerized system of claim 15 in which the system further comprises the second host system being remote from the first host system.

17. The computerized system of claim 15 wherein the first host system is further configured to instruct the processor to:

filter the training event data from the event data stream as a function of a prediction of the contribution of each event in the event data stream to the reduction of error in the neural network, wherein the prediction of the contribution of each event in the event data stream is based at least in part on a determination of whether the prediction is correct or incorrect.

18. The computerized system of claim 15 in which the system further comprises the event data stream being based on data from a camera.

* * * * *